(No Model.) 2 Sheets—Sheet 1.
J. BANWELL.
MACHINE FOR MAKING RIMS FOR PNEUMATIC WHEELS.
No. 571,080. Patented Nov. 10, 1896.
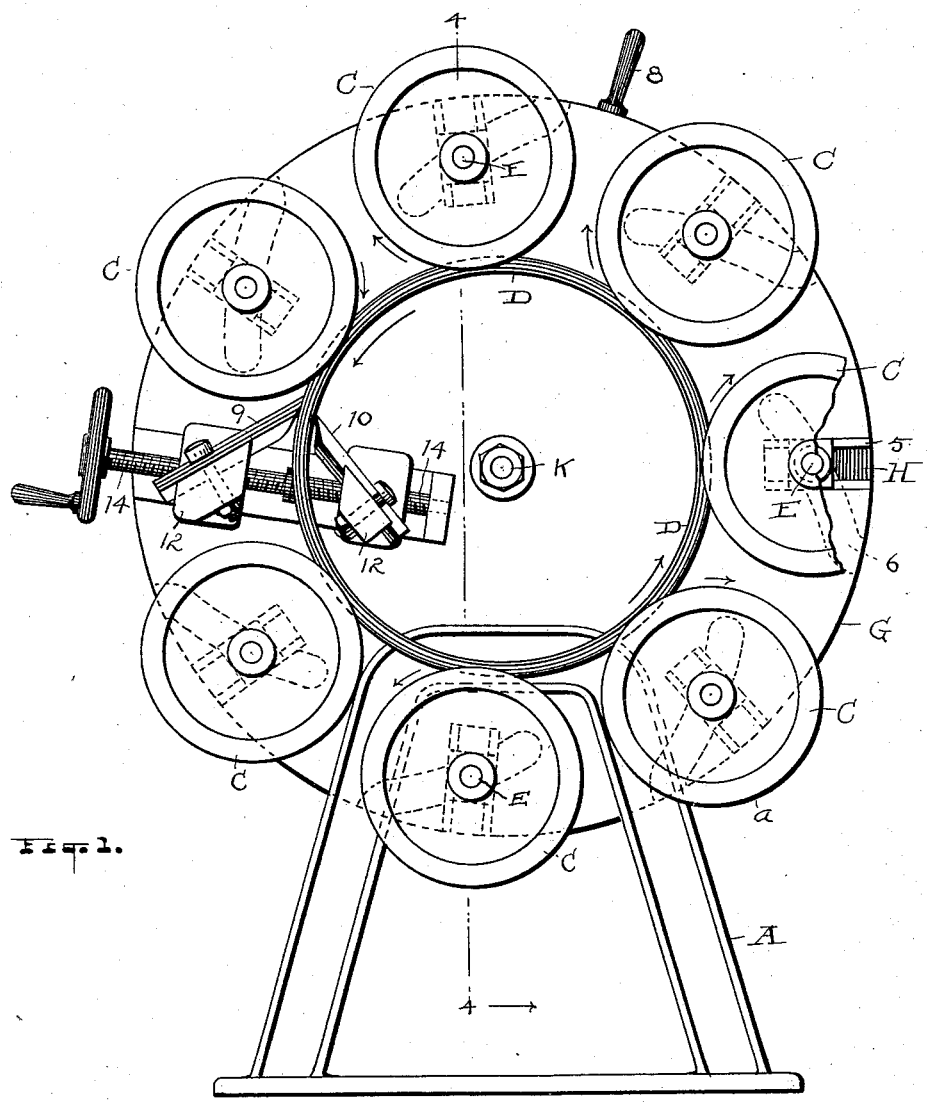
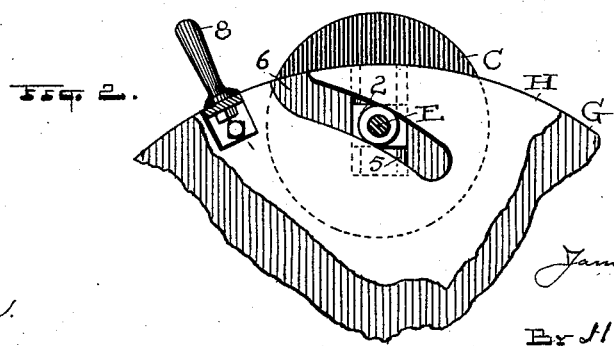
ATTEST.
R B Moser
H E Medora
INVENTOR.
James Banwell
By H J Fisher
ATTY

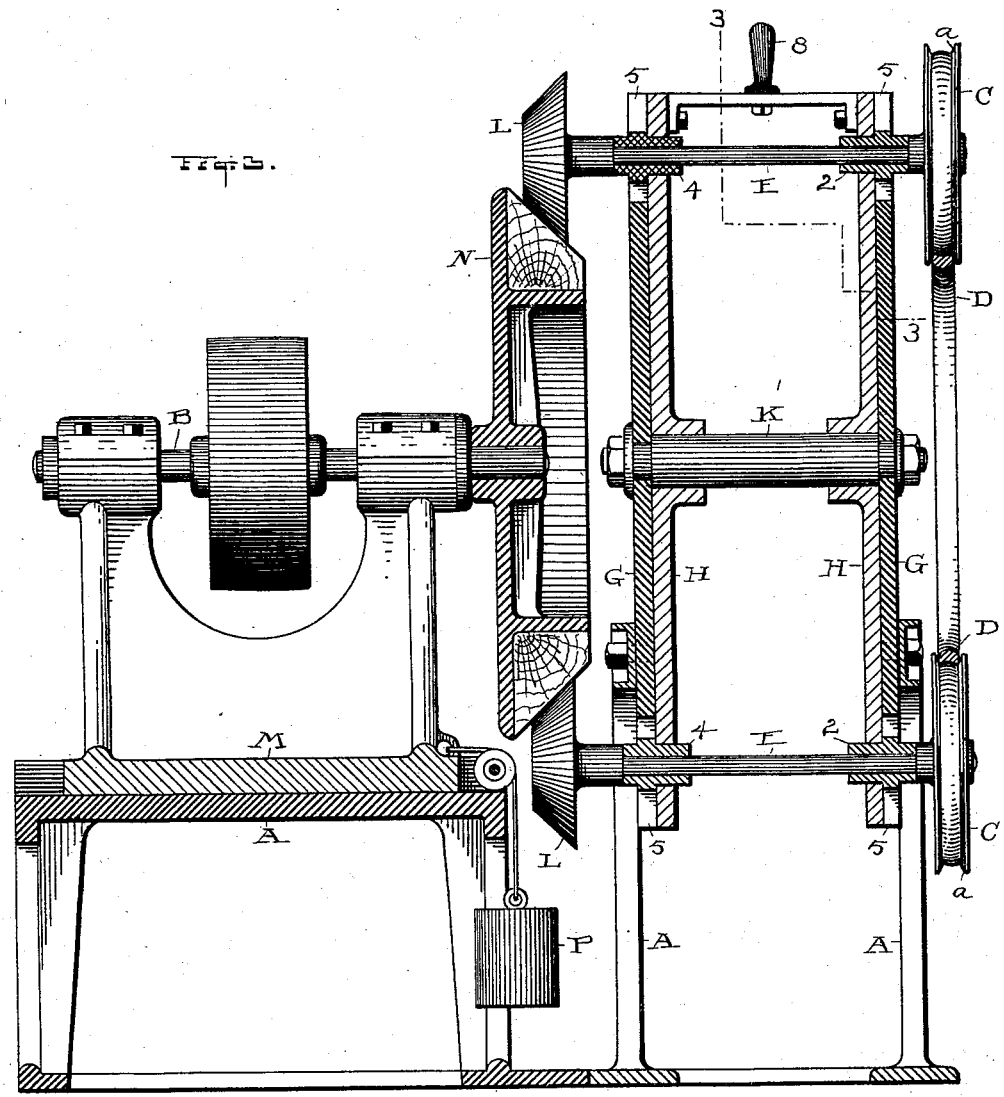

UNITED STATES PATENT OFFICE.

JAMES BANWELL, OF CLEVELAND, OHIO, ASSIGNOR OF TWO-THIRDS TO GEORGE CAUNTER AND FRANK R. WALL, OF SAME PLACE.

MACHINE FOR MAKING RIMS FOR PNEUMATIC WHEELS.

SPECIFICATION forming part of Letters Patent No. 571,080, dated November 10, 1896.

Application filed May 4, 1896. Serial No. 590,161. (No model.)

*To all whom it may concern:*

Be it known that I, JAMES BANWELL, a citizen of the United States, residing at Cleveland, in the county of Cuyahoga and State of Ohio, have invented certain new and useful Improvements in Machines for Making Rims for Pneumatic Wheels; and I do hereby declare that the following is a full, clear, and exact description of the invention, which will enable others skilled in the art to which it appertains to make and use the same.

My invention has reference to machines for making rims for pneumatic wheels; and the invention consists in the construction substantially as shown and described, and particularly pointed out in the claims.

In the accompanying drawings, Figure 1 is a side elevation of my improved machine; and Fig. 2 is an elevation of a section thereof on a line corresponding substantially to 3 3, Fig. 3. Fig. 3 is a central vertical sectional elevation of the machine on a line corresponding substantially to 4 4, Fig. 1.

In the construction of bicycle and like wheels which use a pneumatic tire there is now employed a wooden rim, corresponding to the usual fellies of the ordinary buggy or wagon wheel and adapted to receive the spokes and to carry the tire proper. These wooden rims are concavo-convex in cross-section when finished, substantially as shown in section at the right in Fig. 3. Heretofore these rims have been turned out on a lathe, and it has been very difficult to get them cut to a positively uniform thickness throughout, and if there was perceptibly more stock at one place than another it was difficult to bring the rim to a uniform and even curvature and hence to a perfectly round form.

My invention therefore has for its object not only to turn these rims to shape for use, but to do so with absolute uniformity and evenness.

To this end the machine is constructed with a suitable frame A, which supports all the movable parts. These parts relate primarily to the actuating or operating mechanism, and secondarily to the adjusting mechanism. The operating mechanism extends from the power or drive shaft B to the rim supporting and rotating wheels C, between which is supported the wheel-rim D.

The rim rotating and supporting wheels C have suitably-grooved peripheries, adapted to engage and carry the rim D from start to finish, and are arranged about a perfect circle, and are held and operated in respect thereto throughout all the operations of the machine. To these ends each wheel is supported on the outer extremity of a shaft E, which itself has two bearings 2 and 4, supported each in a radial slot in a disk G, bolted rigidly on frame A and arranged some distance apart in parallel planes. The bearings 2 and 4 are free to slide in the said radial slots 5, but not to turn therein, as seen in Fig. 2, where bearing 2 is shown, though it might be 4 as well, as both are alike.

Inside of disks or plates G and lying flat against the same are other disks H, supported on a shaft K at their center, which in turn is fixed rigidly in the disks G. These latter disks H have each a diagonal slot 6, Figs. 1 and 2, which is eccentric to the axis of said disks and crosses the slots 5 at an inclination about as shown. The bearings 2 and 4 extend through, but fit closely within, the slots 6, so that they may slide therein as they also slide in slots 5; but the slots 6 are so disposed with respect to slots 5 and the bearings and shafts that pass through them that when a rotary movement is given to disks H on their common axis the bearings 2 and 4 will be carried inward or outward according to direction of rotation. A handle-bar 8 is shown as connecting disks H to effect their rotation. Their support and connections make disks H move together as one solid part. If rim D is to be gripped, the disks H are moved so as to carry the bearings 2 and 4 inward in slots 6, and if it is to be released they are turned to carry said bearings outward; but the bearings themselves with their shafts and wheels will move only in radial lines in slots 5. The said wheels C are not only supporting-wheels, but also rotating or operating wheels for wheel-rim D, and to this end the shafts E have each a bevel friction-wheel L, which said wheels L are arranged in a circle like wheels C and are engaged by a large central bevel drive-wheel N, fixed on shaft B.

I prefer friction drive mechanism for sundry reasons, and hence have shown this kind, but of course am not limited thereto, but may use other or equivalent mechanism.

The wheel N and its shaft B are supported in suitable elevated bearings on a sliding table M, held in working position, as here shown, by counterweight P. Here again equivalent means for weight P might be used, as also any suitable means for disengaging wheel N.

Now in order that the rim D may be turned down to shape while it is being held and rotated by the foregoing mechanism I have shown this machine as equipped with two suitable cutters 9 and 10, adapted to engage the inside and the outside of the rim at the same time and oppositely to one another. Each cutter is supported in a suitable block 12, and the said blocks are in turn supported on a reversely-threaded operating-screw 14 and in a slot in the disk G in which the said blocks have a sliding movement. The cutters 9 and 10 are set in these blocks at such an angle of inclination as to do the most effective work, and are fed to the work by said screw 14 and the hand-wheel thereon.

I might introduce rotary cutters in lieu of those shown, but for present uses these are preferred.

When a rim is to be turned, it is put into position between wheels C, and said wheels are adjusted to holding and turning position, and are then allowed to remain, and require no further attention until the rim is finished and is ready to be released. Meantime, during the operation of turning the rim to shape, the wheels and rim are rotated together through shafts E and friction-wheels L and N. Both the cutters and the rotating mechanism are under the control of the operator, and when a rim is finished the machine is stopped and the rim removed and fresh stock put in its place. The flanges a of the wheels C are such that they will engage and hold the stock before turning, as well as afterward, and since the finished product is concave in cross-section on its exterior these wheels have a convex inner surface to match said concavity and insure frictional engagement to the end of the operation.

What I claim as new, and desire to secure by Letters Patent, is—

1. The main frame having fixed disks with slots in their edges, and the two rotating disks having inclined slots in their edges, in combination with shafts and bearings for said shafts constructed to pass through the slots of both sets of disks, rim-engaging wheels on one end of said shafts and power-transmitting wheels on the other ends thereof and a pair of adjustable cutters arranged to engage the rim operated upon, substantially as described.

2. The frame having a set of fixed disks with corresponding radial slots in their edges, and a series of shafts and bearings for said shafts constructed to slide in said slots, in combination with a shaft fixed centrally in said disks, and a set of rotatable disks on said shaft having each diagonal slots engaging said bearings and provided with means to rotate the said disks, and wheels on the ends of said series of shafts outside said disks, substantially as described.

3. The means described for adjusting the rim-carrying wheels consisting of the stationary disks having radial slots in their periphery, the rotatable disks having slots crossing said radial slots at an angle thereto, the shafts and bearings for the shafts engaged in both sets of said slots and rim-engaging wheels on one end of said shafts and power-transmitting wheels on the other ends thereof, substantially as described.

4. The two sets of disks having slots in a circle at an angle to each other and shafts supported in said slots, in combination with a series of circularly-arranged channeled supporting and rotating wheels on the corresponding ends of said shafts and a set of turning-blades adjustably arranged on the inner circle between said wheels, whereby wooden rims for wheels are rotated and turned to shape, substantially as described.

Witness my hand to the foregoing specification of this 28th day of April, 1896.

JAMES BANWELL.

Witnesses:
H. T. FISHER,
R. B. MOSER.